US011267348B2

(12) United States Patent
Hocke et al.

(10) Patent No.: US 11,267,348 B2
(45) Date of Patent: Mar. 8, 2022

(54) INDUCTIVE CHARGING SYSTEM FOR A VEHICLE, AND USE

(71) Applicant: Bayerische Motoren Werke Aktiengesellschaft, Munich (DE)

(72) Inventors: Fredrik Hocke, Munich (DE); Helmut Wagatha, Oberschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 306 days.

(21) Appl. No.: 16/124,720

(22) Filed: Sep. 7, 2018

(65) Prior Publication Data
US 2019/0001829 A1 Jan. 3, 2019

Related U.S. Application Data

(63) Continuation of application No. PCT/EP2017/051461, filed on Jan. 25, 2017.

(30) Foreign Application Priority Data

Mar. 10, 2016 (DE) ...................... 10 2016 203 933.4

(51) Int. Cl.
*H02J 7/00* (2006.01)
*B60L 53/12* (2019.01)
(Continued)

(52) U.S. Cl.
CPC ............... *B60L 53/12* (2019.02); *B60L 53/38* (2019.02); *H02J 7/025* (2013.01); *H02J 50/90* (2016.02);
(Continued)

(58) Field of Classification Search
USPC ........................................................ 320/108
See application file for complete search history.

(56) References Cited

U.S. PATENT DOCUMENTS 5,661,391 A * 8/1997 Ito ........................... H02J 50/40
320/108
2011/0181240 A1* 7/2011 Baarman ................... H02J 7/00
320/108
(Continued)

FOREIGN PATENT DOCUMENTS

CN 102555832 A 7/2012
CN 102695629 A 9/2012
(Continued)

OTHER PUBLICATIONS

International Search Report (PCT/ISA/210) issued in PCT Application No. PCT/EP2017/051461 dated Apr. 20, 2017 with English translation (six (6) pages).
(Continued)

*Primary Examiner* — Samuel Berhanu
(74) *Attorney, Agent, or Firm* — Crowell & Moring LLP

(57) ABSTRACT

An inductive charging system for a vehicle having an electrical storage unit, in particular, an electric vehicle and a method of using the inductive charging system are provided. The inductive charging system preferably has a first coil device for a charging station and a second coil device for mounting on a vehicle, wherein the second coil device is preferably designed to magnetically interact with the first coil device. Furthermore, the inductive charging system preferably has a first positioning device, which movably supports the first coil device, wherein the system is preferably designed to produce an attractive magnetic force between the first coil device and the second coil device, which magnetic force causes a defined orientation of the first coil device in relation to the second coil device by the positioning unit.

17 Claims, 2 Drawing Sheets

(51) Int. Cl.
*B60L 53/38* (2019.01)
*H02J 50/90* (2016.01)
*H02J 7/02* (2016.01)

(52) U.S. Cl.
CPC ............ *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | |
|---|---|---|---|
| 2012/0098483 A1 | 4/2012 | Patel | |
| 2014/0035520 A1* | 2/2014 | Nakayama | B60L 53/38 320/108 |
| 2015/0077206 A1 | 3/2015 | Leyland et al. | |
| 2015/0104928 A1 | 4/2015 | Kozai et al. | |
| 2015/0137801 A1 | 5/2015 | Raedy et al. | |
| 2015/0175025 A1* | 6/2015 | Barbul | B60L 53/305 320/108 |
| 2015/0224882 A1* | 8/2015 | Brill | H01F 38/14 320/108 |
| 2015/0311740 A1* | 10/2015 | Hilario | H01F 38/14 320/108 |
| 2016/0318413 A1 | 11/2016 | Roehrl et al. | |

FOREIGN PATENT DOCUMENTS

| | | |
|---|---|---|
| CN | 104520153 A | 4/2015 |
| CN | 104582999 A | 4/2015 |
| DE | 10 2011 118 287 A1 | 5/2013 |
| DE | 10 2012 214 201 A1 | 5/2014 |
| DE | 10 2012 219 986 A1 | 6/2014 |
| DE | 10 2013 227 129 A1 | 6/2015 |
| JP | 8-9512 A | 1/1996 |
| JP | 2010-22183 A | 1/2010 |
| WO | WO 2011/084936 A2 | 7/2011 |
| WO | WO 2014/029439 A1 | 2/2014 |
| WO | WO 2015/067816 A1 | 5/2015 |

OTHER PUBLICATIONS

German-language Written Opinion (PCT/ISA/237) issued in PCT Application No. PCT/EP2017/051461 dated Apr. 20, 2017 (six (6) pages).

German Search Report issued in counterpart German Application No. 10 2016 203 933.4 dated Mar. 21, 2016 with partial English translation (11 pages).

Chinese-language Office Action issued in Chinese Application No. 201780005265.2 dated Aug. 20, 2020 with English translation (19 pages).

* cited by examiner

INDUCTIVE CHARGING SYSTEM FOR A VEHICLE, AND USE

CROSS REFERENCE TO RELATED APPLICATIONS

This application is a continuation of PCT International Application No. PCT/EP2017/051461, filed Jan. 25, 2017, which claims priority under 35 U.S.C. § 119 from German Patent Application No. 10 2016 203 933.4, filed Mar. 10, 2016, the entire disclosures of which are herein expressly incorporated by reference.

BACKGROUND AND SUMMARY OF THE INVENTION

The invention relates to a system and the use thereof for inductive charging of an energy storage unit of a vehicle.

In the field of electromobility, in particular, devices for charging secondary cells are very important. In order to make the use of an electric vehicle, for example, a vehicle having an energy storage unit and an electric drive, as convenient and safe as possible for a user, an operation to charge the energy storage unit should be such that it can be performed rapidly, efficiently and easily. Particularly suitable in this regard are systems for inductive charging of the energy storage devices, since in this case the charging is effected wirelessly. It is thus possible to dispense with charging cables, which makes the charging operation particularly convenient and safe.

For the purpose of inductive charging, a charging coil of a charging station is brought into the proximity of a receiving coil of a vehicle, and in the charging coil an alternating magnetic field is generated, which generates an alternating current in the receiving coil.

In order to achieve a high degree of efficiency in the transfer of energy between the charging coil and the receiving coil, the charging coil and receiving coil must be positioned with precision relative to each other. The efficiency of the charging operation is reduced if alignment is non-optimal, i.e., even in the case of deviations of a few centimeters. This results in longer charging times.

The publication DE 10 2013 227 129 A1 relates to a method for sensing the relative position of a transmitting charging coil and a receiving charging coil by sensing a magnetic orientation field by means of at least one sensor coil, in order to achieve better alignment of the transmitting charging coil and receiving charging coil.

The publication US 2015 0 104 928 A1 relates to a device for wireless charging, having a control unit that is communicatively coupled to a positioning system, the positioning system being coupled to a transmission coil, and the positioning system being designed to rotate this transmission coil about a first axis and a second axis.

The publication US 2015 0 137 801 A1 relates to a method and a device for aligning a vehicle with an inductive charging system, alignment coils being added to a secondary coil on the vehicle, and a primary coil, upon being energized, generating a magnetic field that induces a voltage in the alignment coils in dependence on the distance between the alignment coils and the main axis of the primary coil.

It is an object of the present invention to make the operation of charging an energy storage unit of a unit simpler and more efficient, and at the same time convenient for the user.

This object is achieved by an inductive charging system, and by the use thereof, according to the independent claims. Advantageous designs of the invention are provided by the dependent claims. The disclosure of the claims is expressly made part of the description.

A first aspect of the invention relates to an inductive charging system for a vehicle having an electrical storage unit, in particular, an electric vehicle. The inductive charging system preferably has a first coil means for a charging station, and a second coil means for mounting on a vehicle, wherein the second coil means is designed to interact magnetically, in particular, inductively, with the first coil means. Furthermore, the inductive charging system preferably has a first positioning unit that movably supports the first coil means. The system is preferably designed to generate, between the first coil means and the second coil means, an attractive magnetic force that effects a defined alignment of the first coil means with respect to the second coil means, by means of the positioning unit.

A second aspect of the invention relates to the use of the inductive charging system according to the first aspect of the invention. In the case of the use of an inductive charging system, preferably at least one first constant magnetic field is generated by a first coil means or at least one first magnetic field module, and at least one second constant magnetic field is generated by a second coil means or at least one second magnetic field module. The at least one first constant magnetic field is preferably oriented relative to the at least one second constant magnetic field in such a manner that an attractive magnetic force is generated between the first coil means and the second coil means. The energy storage unit of the vehicle is preferably charged inductively by use of the first coil means and the second coil means.

The invention is based on the approach of positioning a first coil means and a second coil means by using an attractive magnetic force. The positioning, i.e., moving and/or tilting into a defined alignment, or end position, of the two coil means relative to each other in this case is preferably effected autonomously, i.e., automatically, on the basis of the attractive magnetic force. The defined alignment corresponds to a position of the first coil means and the second coil means in which efficiency in an inductive interaction is particularly high. The defined alignment in this case relates, in particular, to the orientation of axes of the two coil means. A particularly preferred defined alignment corresponds, for example, to axial alignment of winding axes of the two coil means.

The first coil means is preferably part of a charging station for charging a vehicle having an electrical storage unit, in particular, an electric vehicle, and is movably supported by a first positioning unit, i.e., it can be moved or tilted translationally. The second coil means is provided for mounting in or on such a vehicle. If the vehicle is positioned at, on or under the charging station, in particular, with an accuracy of 30 cm or greater, in particular, manually or semi-manually, for example, by use of a radio-frequency positioning unit, the attractive magnetic force can act between the first coil means and the second coil means. As a result of the attractive magnetic force, the first, movably supported coil means moves out of an original position by moving and/or tilting translationally relative to the second coil means. In particular, the first coil means moves toward the second coil means, according to the vector of the attractive magnetic force.

In the defined alignment, i.e., the preferred end position of the first and second coil means, the charging operation is performed in that an alternating magnetic field is generated in the first coil means, which alternating magnetic field induces in the second coil means an alternating current for charging the electrical storage unit of the vehicle. The charging operation is particularly safe for the user, since coupling, i.e., the positioning of the first coil means and second coil means in a defined alignment, is effected autonomously, and it is possible to dispense with the handling of charging cables, in particular, charging cables carrying high voltage.

The first positioning unit is preferably designed to enable the first coil means to be moved and/or tilted translationally, even in the case of small forces acting on the first coil means. This enables the first coil means to be positioned autonomously, i.e., automatically, in a defined alignment relative to the second coil means, even in the case of weak attractive magnetic forces, in particular, caused by a large distance between the first coil means and the second coil means. In particular, the defined alignment, which corresponds to a particularly preferred alignment for increasing the efficiency of the charging operation, is achieved in a particularly precise and reliable manner.

Preferably, the second coil means also is movably supported by a second positioning unit. As a result, in particular, more degrees of freedom are available for moving the first coil means and the second coil means relative to each other, in particular, out of a respective original position, into the defined alignment.

Overall, by means of autonomous, i.e., automatic, defined alignment of a first coil means and a second coil means, the invention enables a vehicle having an electrical storage unit, in particular, an electric vehicle, to be charged in a particularly efficient, safe and convenient manner.

In an advantageous design of the inductive charging system, the first coil means is designed to generate a first constant magnetic field, and the second coil means is designed to generate a second constant magnetic field, wherein the first and second constant magnetic fields are oriented in relation to each other in such a manner that an attractive magnetic force is generated between the first coil means and the second coil means. This may be realized, in particular, by applying a constant current in both the first coil means and the second coil means. An attractive magnetic force can thereby be generated, in a particularly simple and efficient manner, between the first coil means and the second coil means.

In a further advantageous design of the inductive charging system, the first coil means has at least one first magnetic module that is designed to generate at least one first constant magnetic field, and the second coil means has at least one second magnetic module that is designed to generate at least one second constant magnetic field. Preferably, the at least one first constant magnetic field and the at least one second constant magnetic field are oriented in relation to each other in such a manner that an attractive magnetic force is effected between the first coil means and the second coil means. Preferably, the at least one first and/or second magnetic module is attached to the first and/or second coil means in such a manner that the direction of the generated attractive magnetic force runs in the defined alignment, i.e., the preferred position of the first coil means and the second coil means. In particular, the magnetic modules are each provided at the edges of the first coil means and the second coil means. As a result of a plurality of magnetic modules being attached in each case, the force coupling between the first coil means and the second coil means can be established in a particularly reliable manner and, moreover, the direction of the attractive magnetic force, i.e., its vector, can be defined particularly clearly. As a result, movement along the vector of the attractive magnetic force leads particularly reliably into the defined alignment of the first coil means and the second coil means.

In a further advantageous design of the inductive charging system, the at least one first magnetic module is designed as at least one first permanent magnet or at least one first electromagnet, and the at least one second magnetic module is designed as at least one second permanent magnet or at least one second electromagnet. Magnetic modules realized as permanent magnets are particularly reliable in generating a strong attractive magnetic force, while at the same time being of small volume, such that a particularly space-saving arrangement on the first and second coil means is made possible. Electric fields, and consequently an attractive magnetic force, can be generated in a very selective, i.e., dosed, manner by magnetic modules realized as electromagnets. In a further advantageous design, the attractive magnetic force can thereby be switched off after the charging operation, such that a particularly slight moving of the first coil means and/or the second coil means is possible, in particular into a first and/or second original position. In another advantageous design, the polarity of the magnetic field that is generated at the first or second coil means by the at least one magnetic module realized as an electromagnet can be reversed, such that a repulsive magnetic force acts between the first coil means and the second coil means. As a result, it is particularly easy to move the first coil means and/or the second coil means after the charging operation, in particular into a first and/or second original position.

In a further advantageous design of the inductive charging system, the first positioning unit movably supports the first coil means in such a manner that a translational movement and/or a tilting of the first coil means in at least one spatial direction, out of a first original position, is possible. In a further advantageous design, for this purpose the first positioning unit has smooth-running rollers, or wheels, and/or bearings, which, in a further advantageous embodiment, run on guide rails. As a result, the first coil means can be moved and/or tilted particularly easily, i.e., by the action of small forces.

In a further advantageous design of the inductive charging system, the first positioning unit has at least one first movement device, which is designed to generate a translational movement and/or a tilting of the first coil means in at least one spatial direction. In an advantageous design, the movement device is realized as a drive, in particular, as a hydraulic or electric drive. Preferably, the drive assists the translational movement and/or tilting, induced by the attractive magnetic force, in at least one spatial direction. A particularly reliable, defined alignment of the first and/or second coil means relative to each other is thereby ensured.

In a further advantageous design, the inductive charging system has a second positioning unit that movably supports the second coil means in such a manner that a translational movement and/or a tilting of the second coil means in at least one spatial direction, out of a second original position, is possible. In a further advantageous design, for this purpose the second positioning unit has smooth-running rollers, or wheels, and/or bearings, which, in a further advantageous embodiment, run on guide rails. As a result, the second coil means can be moved and/or tilted particularly easily, i.e., by the action of small forces.

In a further advantageous design of the inductive charging system, the second positioning unit has at least one second movement device, which is designed to generate a translational movement and/or tilting of the second coil means in at least one spatial direction. In an advantageous design, the movement device is realized as a drive, in particular as a hydraulic or electric drive. Preferably, the drive assists the translational movement and/or tilting, induced by the attractive magnetic force, in at least one spatial direction. A particularly reliable translational movement and/or tilting in the defined alignment of the first and/or second coil means is thereby ensured.

In a further advantageous design of the inductive charging system, the first positioning unit and/or the second positioning unit are/is designed to fix the first coil means and/or the second coil means in the defined alignment. In an advantageous design, this may be effected by blocking, or locking, the first or second movement device. In particular, in one design, the flow of hydraulic fluid is stopped, or a rotor of an electric motor is blocked. In a further advantageous design, a mechanical device, in particular, at least one bolt, blocks the wheels, or rollers, or bearings of the movement device. It is thereby ensured that the first and/or second coil means, after having attained the defined alignment, in particular, during the charging operation, can no longer be moved out of the defined alignment, and the efficiency of the transfer of energy from the first coil means to the second coil means cannot decrease.

In a further advantageous design of the inductive charging system, the first coil means and the second coil means have a geometric positioning assistance means, in particular in the form of centering studs and centering recesses. In a further advantageous design, the geometric positioning assistance means is realized as at least one cone or truncated cone and at least one cone cavity or truncated-cone cavity.

In particular, in this case the centering studs, cones or truncated cones are provided on the first or second coil means, and the centering recesses, cone cavity or truncated-cone cavity are provided correspondingly, as a counterpiece, on the second or first coil means. Upon approaching of the first or second coil means, in particular, as a result of action of an attractive magnetic force, the centering studs, cones or truncated cones slide into the centering recesses, cone cavities or truncated-cone cavities provided for this purpose, and thereby effect a particularly precise positioning of the first and/or second coil means. In an advantageous design, the centering studs are realized in a conical shape, and the centering recesses are realized as a conical cavity. As a result, the centering studs, like a cone or truncated cone, can slide into the corresponding centering cavities from any direction. In a further advantageous design, only one conical centering stud, cone or truncated cone, and correspondingly one conical centering recess, cone cavity or truncated-cone cavity are provided, such that an unwanted, incorrect assignment of a centering stud to a centering cavity, of a cone to a cone cavity, or of a truncated cone to a truncated-cone cavity can be avoided particularly easily. In this design, the centering stud and recess, the cone and cone cavity, or truncated cone and truncated-cone cavity are preferably particularly obtuse, i.e., the corresponding cone surface is particularly large, or the angle between the cone surface and the cone base is particularly small, thereby facilitating the interaction of the centering stud and centering recess, the cone and cone cavity, or the truncated cone and truncated-cone cavity.

In a further advantageous design of the inductive charging system, attached to the first coil means and/or the second coil means there is at least one stopper, which is designed to stop the movement of the first positioning device and/or second positioning device upon attainment of the defined alignment. Preferably, the at least one stopper is made of a soft and/or elastic material, such as rubber. In a further advantageous design, the at least one stopper is provided in the proximity of, in particular, next to, the geometric positioning assistance means. In a further advantageous design, the at least one stopper is provided in the proximity of, in particular, next to, at least one first and/or second magnetic module.

The attaching of at least one stopper reliably ensures a minimum distance of the first and second coil means in the defined alignment. Furthermore, the at least one stopper damps the first and/or second coil means upon sliding into the defined alignment as a result of the attractive magnetic force, such that damage resulting from an abrupt collision of the first and/or second coil means in the defined alignment is avoided.

In a further advantageous design, the inductive charging system has a radio-frequency positioning unit that is designed to generate a radio-frequency signal, in particular at a frequency of substantially 80 or 90 kHz, in the first coil means. Preferably, the inductive charging system additionally has antennas, which are provided for mounting in the vehicle and for receiving the radio-frequency signal. The radio-frequency positioning unit is preferably designed to generate, from the radio-frequency signals received by the antennas, a positioning signal relating to the relative position of the second coil means with respect to the first coil means, on the basis of which positioning signal the vehicle and/or its driver can align the second coil means with respect to the first coil means, according to the defined alignment, to an accuracy of at least 30 cm, by moving the vehicle. The first coil means and the second coil means are thereby preferably brought to a minimum distance, in which the attractive magnetic force acts reliably between the first coil means and the second coil means and a defined alignment of the first coil means and the second coil means is ensured. In an advantageous design, the antennas are provided at a plurality of locations on the vehicle, in particular distant from each other, enabling the relative position of the second coil means with respect to the first coil position to be determined in a particularly accurate manner.

In a further advantageous design, antennas of other systems already present in the vehicle, in particular, systems for wireless vehicle access and/or control of vehicle equipment, are used as antennas of the inductive charging system. In particular, already existing infrastructure of the vehicle is used for the inductive charging system. The vehicle can thereby use the inductive charging system in a particularly simple and uncomplicated manner.

In a further advantageous design of the inductive charging system, the first coil means and/or the second coil means have/has a protection device, in particular, a protection device against dust and stones. The protection device may be realized, in particular, as a plastic or plastics-material cover, or a corresponding enclosure. Damage to, or dirtying of, the first and/or second coil means and/or the first and/or second positioning unit is thereby reliably prevented.

In an advantageous design of the use of the inductive charging system, a movement of the first and/or second coil means by translational moving and/or tilting of the first and/or second coil means on the basis of the attractive magnetic force as far as the defined alignment is assisted, by translational moving and/or tilting of the first and/or second coil means along at least one spatial direction, by at least one first and/or second movement device. In an advantageous design, for this purpose the movement device is realized as a drive, in particular as a hydraulic or electric drive. Preferably, the drive assists the translational movement and/or tilting in at least one spatial direction, which movement is induced, in particular, by the attractive magnetic force. A particularly reliable, defined alignment of the first and/or second coil means relative to each other is thereby ensured.

In a further advantageous design, the first and/or second positioning unit have/has at least one movement sensor, and the at least one first and/or second movement unit have/has at least one control device. In particular, the at least one movement sensor in this case is part of at least one movement unit. The at least one control device is designed to recognize a translational movement and/or tilting of the first and/or second coil means along at least one spatial direction, on the basis of the signal of the at least one movement sensor, and to control the at least one first and/or second movement unit in such a manner that the at least one first and/or second movement unit assists the translational movement and/or tilting of the first and/or second coil means along at least one spatial direction.

In particular, the at least one control device is designed to effect, by means of the first and/or second movement unit, a positive and/or negative acceleration and/or a constant translational movement and/or tilting, in particular an inclination, of the first and/or second coil means. Preferably, the at least one control device additionally has a closed-loop control device that, by closed-loop control, controls the acceleration and/or constant translational movement and/or tilting, in particular on the basis of the signals of the at least one movement sensor. In particular, the closed-loop control device prevents the at least one movement device from effecting a strong acceleration and/or high constant translational movement and/or rapid tilting, or prevents the first and/or second coil means from being strongly accelerated and/or moved rapidly and/or tilted rapidly. In an advantageous design, the closed-loop control device controls, by closed-loop control, the at least one movement device in such a manner that a damping of translational movements and/or tiltings of the first and/or second coil means is effected.

A translational movement and/or tilting of the first and/or second coil means into the defined alignment is thereby effected in a particularly reliable manner. In particular, it is ensured that, even in the case of slight action of the attractive magnetic force, a precisely defined alignment of the first and second coil means is achieved.

In a further advantageous design of the use of the inductive charging system, following the inductive charging of the energy storage unit of the vehicle, the first and/or second coil means are/is moved back out of the defined alignment, into the first and/or second original position, by the first and/or second movement device. Damage to the first and/or second coil means and or to the vehicle, in the case of a movement of the vehicle following the charging operation, is thereby prevented.

The features and advantages described with respect to the first aspect of the invention and its advantageous design also apply to the second aspect of the invention and its advantageous design, and vice versa.

Further features, advantages and application possibilities of the invention are given by the following description in conjunction with the figures. There are shown, at least partially in schematic form:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
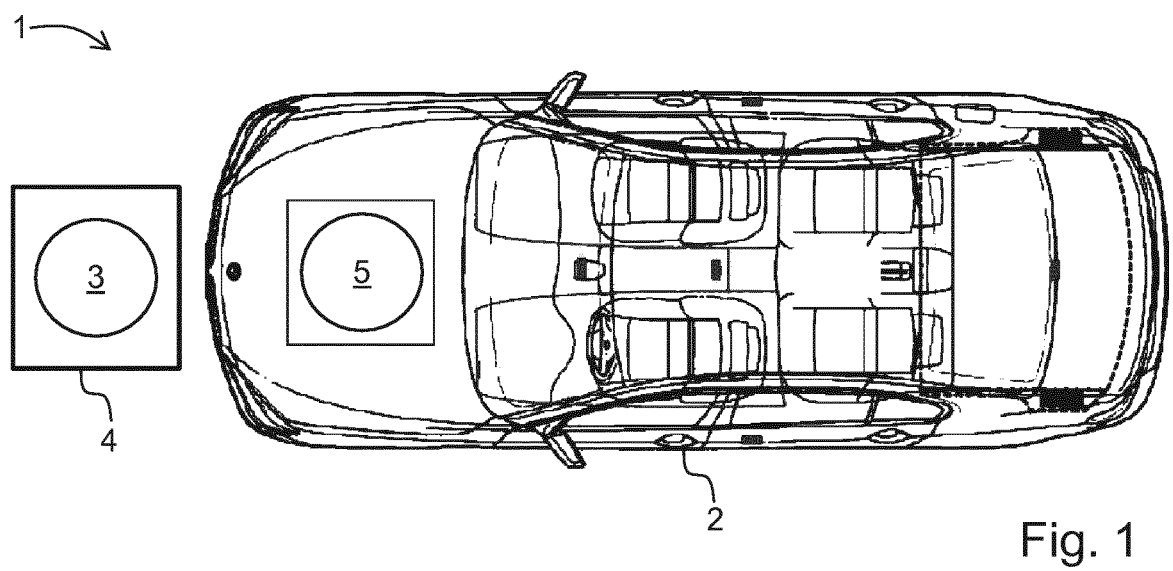
FIG. 1 illustrates a first embodiment of an inductive charging system for a vehicle.

FIG. 1 shows a first embodiment of an inductive charging system 1 for a vehicle 2. The inductive charging system 1 has a first coil means 3, which is realized, in particular, as a first coil. The first coil means 3 is preferably part of a charging station 4 at which a vehicle 2, preferably a vehicle having an electrical storage unit, further preferably an electric vehicle, can be charged. In particular, the first coil means 3 is designed to generate an alternating magnetic field.

The inductive charging system 1 has a second coil means 5, which is realized, in particular, as a second coil and preferably intended for mounting in the vehicle 2. The second coil means 5 is designed, in particular, to provide the vehicle 2 with current, induced in the second coil means 5. In particular, the second coil means 5 is designed to charge an electrical storage unit of the vehicle 2, in particular, an electric vehicle, with the current induced in the second coil means 5. The current induced in the second coil means 5 is preferably induced by an alternating magnetic field generated by the first coil means 3. In particular, the first coil means 3 is designed to induce a current in the second coil means 5 by means of the generated alternating magnetic field. The inductive charging system 1 thereby provides current to the vehicle 2 in a particularly simple, safe and convenient manner, in particular for the purpose of charging an electrical storage unit of the vehicle 2.

In order to achieve a high degree of efficiency of transfer of energy from the first coil means 3 to the second coil means 5, i.e., in order for the alternating magnetic field generated by the first coil means 3 to be strongly coupled to the second coil means 5, it is necessary to bring, in particular, to move, the first coil means 3 close to the second coil means 5. The second coil means 5 is therefore preferably provided at a location on the vehicle 2 to which the first coil means 3 of the charging station 4 can be brought close, or easily approached. Alternatively or additionally, the second coil means 5 is preferably provided at a location on the vehicle 2 at which the second coil means 5 can be brought close to the first coil means 3 of the charging station 4. In particular, the second coil means 5 is mounted under the engine hood, under the tailgate, under the vehicle roof, or on the vehicle floor.

Preferably, the vehicle 2 is designed to bring the second coil means 5 into the proximity of the first coil means 3, in a first, rough positioning. In particular, the vehicle 2 is designed to bring the second coil means 5 to up to 30 cm or closer to the first coil means 3, i.e., to bring the second coil means 5 to up to 30 cm over, under or next to the first coil means 3. This is preferably effected by a radio-frequency positioning unit (not represented).

Preferably, the first coil means 3 is movably supported, such that it can easily be moved close to the second coil means 5. Furthermore, preferably, the second coil means 5 is also movably supported, such that it can easily be moved close to the first coil means 3.

In order to position the first coil means 3 in the proximity of, i.e., next to, under or over, the second coil means 5, in a second, fine positioning, the inductive charging system 1 is designed to generate, between the first coil means 3 and the second coil means 5, an attractive magnetic force 23, because of which the first coil means 3 and the second coil means 5 move autonomously, i.e., automatically, toward each other. In particular, because of the attractive magnetic force 23, the first coil means 3 positions itself with an accuracy of greater than 30 cm, in particular, substantially 1 cm, in a defined alignment with respect to the second coil means 5.

Furthermore, preferably, because of the magnetic force 23, the second coil means 5 also moves autonomously, i.e., automatically, toward the first coil means 3, such that as a result the first coil means 3 is brought into a defined alignment with respect to the second coil means 5, or the first coil means 3 and the second coil means 5 are brought into a defined alignment relative to each other.

The defined alignment in this case corresponds to an alignment, of the first coil means 3 with respect to the second coil means 5, in which the alternating magnetic field generated in the first coil means 3 induces a current in the second coil means 5 in a particularly efficient manner.

As a result of the attractive magnetic force 23, the first coil means 3 is brought into a defined alignment with respect to the second coil means 5 in a particularly simple manner and without additional effort, i.e., without active control. In addition, a particularly precise, defined alignment of the first coil means 3 with respect to the second coil means 5, or of the first coil means 3 and the second coil means 5 relative to each other, is thereby achieved.

Figure 2:
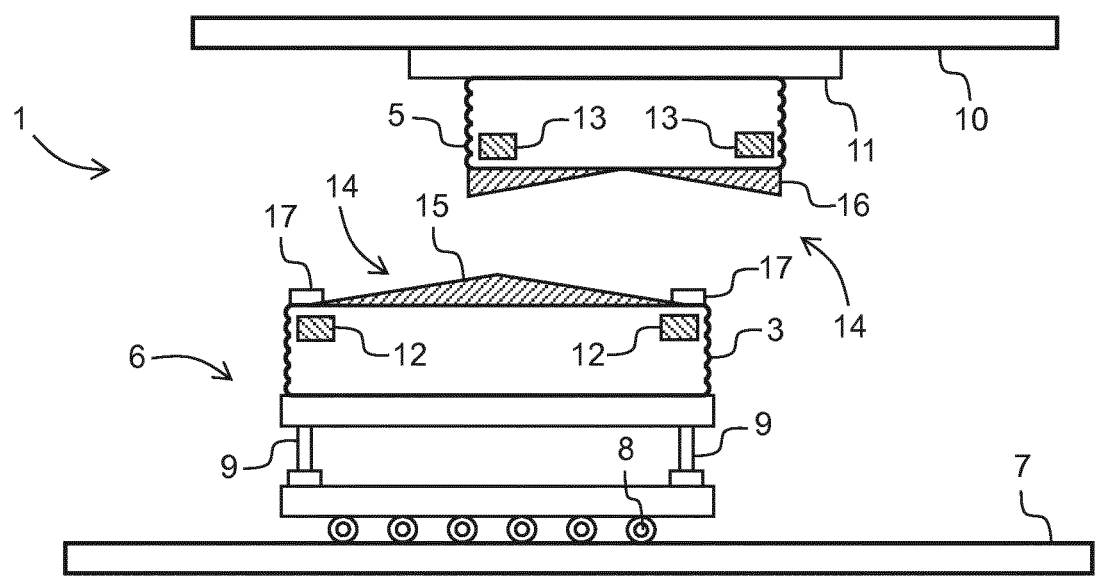
FIG. 2 illustrates a second embodiment of an inductive charging system for a vehicle.

FIG. 2 shows a second embodiment of an inductive charging system 1 for a vehicle 2. The first coil means 3 is attached to a first positioning unit 6, which movably supports the first coil means 3. In particular, the first positioning unit 5 is designed to enable the first coil means 3 to move horizontally, i.e., parallel to the ground 7. For this purpose, the first positioning unit 6 preferably has rollers 8, wheels, bearings or a rail system. In addition, the first positioning unit 6 is designed to enable the first coil means 3 to move vertically, i.e., perpendicularly in relation to the ground 7, in particular to be raised or lowered. For this purpose, the first positioning unit 6 preferably has bearings, a mechanical system, a hydraulic system 9 and/or an electromechanical system, in particular, at least one electric motor (not represented), or a combination thereof.

As a result, the first coil means 3 can preferably be moved even by slight acting forces, in particular an attractive magnetic force 23.

The second coil means 5 is attached by a mounting 11 to the floor 10 of the vehicle 2. Preferably, the mounting is realized as a second positioning unit 11, which movably supports the second coil means 5. In particular, the second positioning unit 11 enables the second coil means 5 to move horizontally, i.e., substantially parallel to the vehicle floor 10, and to move vertically, i.e., substantially perpendicularly in relation to the vehicle floor 10.

Preferably, as a result, the second coil means 5 also can be moved even by slight acting forces, in particular an attractive magnetic force 23.

Preferably, the first positioning unit 6 and/or the second positioning device 11 are/is designed to assist a movement of the first coil means 3 and/or of the second coil means 5. For this purpose, the first positioning unit 6 and/or the second positioning unit 11 preferably each have/has a first and/or second movement device. The first and/or second movement device are/is preferably designed to generate a movement of the first coil means 3 and/or of the second coil means 5 parallel to the ground 7, or parallel to the vehicle floor 10. Furthermore, preferably, the first and/or second movement device are/is designed to generate a movement of the first coil means 3 and/or of the second coil means 5 perpendicularly in relation to the ground 7, or perpendicularly in relation to the vehicle floor 10. Furthermore, preferably, the first and/or second movement device are/is designed to recognize, in particular, to register or identify, a movement of the first coil means 3 and/or second coil means 5 on the basis of the attractive magnetic force 23, and thereupon to move the first coil means 3 and/or second coil means 5 according to the recognized movement.

The first coil means 3 and the second coil means 5 are preferably each designed to generate a constant magnetic field. This may be effected, in particular, by applying a constant current both to the first coil means 3 and to the second coil means 5. The first coil means 3 and the second coil means 5 thus in effect act as electromagnets. The polarity of the constant magnetic fields of the first coil means 3 and second coil means 5 is selected such that the attractive magnetic force 23 is generated between the first coil means 3 and the second coil means 5.

Alternatively or additionally, the first coil means 3 has at least one first magnetic module 12, and the second coil means 5 has at least one second magnetic module 13. The at least one first magnetic module 12 is designed to generate at least one first constant magnetic field, and the at least one second magnetic module 13 is designed to generate at least one second constant magnetic field. The polarity of the first magnetic field, generated by the at least one first magnetic module, and of the second magnetic field, generated by the at least one second magnetic module 13, is selected such that the attractive magnetic force 23 is generated between the at least one first magnetic module 12 and the at least one second magnetic module 13. Preferably, as a result, the first coil means 3 and the second coil means 5 move autonomously, i.e., automatically, toward each other.

The at least one first magnetic module 12 and the at least one second magnetic module 13 are preferably realized as a permanent magnet. A strong first magnetic field and a strong second magnetic field can thereby be easily generated with, at the same time, the at least one first magnetic module 12 and the at least one second magnetic module 13 being of a compact design.

Furthermore, the at least one first magnetic module and the at least one second magnetic module 13 are preferably realized as electromagnets. This enables a first magnetic field and a second magnetic field to be set in a particularly flexible manner, i.e., in dependence on a situation. In particular, this enables the first and second magnetic fields to be deactivated, such that the first coil means 3 and the second coil means 5 can be separated, i.e., removed from each other, particularly easily following the charging operation.

Preferably, the first coil means 3 and the second coil means 5 have a geometric positioning assistance means 14. In particular, the geometric positioning assistance means 14 consists of at least two complementary positioning elements, the first positioning element 16 being attached to the first coil means 3, and the second positioning element 16 being attached to the second coil means 5. The positioning assistance means 14 is designed to assist the movement of the first coil means 3 and/or of the second coil means 5 into the defined alignment. In particular, the positioning assistance means 14 guides the first coil means 3 and/or the second coil means 5 into the defined alignment.

Preferably, the at least two complementary positioning elements of the positioning assistance means 14 are realized as centering studs and centering recesses. The centering studs are designed, in particular, to engage in the centering recesses as the first coil means 3 approaches the defined alignment with respect to the second coil means 5. The first coil means 3 can thereby be positioned, in particular, autonomously, in a particularly precise manner in the defined alignment with respect to the second coil means 5.

Preferably, the first coil means 3 has at least one stopper 17. The at least one stopper 17 is designed to prevent the first coil means 3 from approaching the second coil means 5 too strongly. In particular, the at least one stopper 17 is designed to stop the first coil means 3 and the second coil means 5 upon attainment of the defined alignment. The first coil means 3 or the second coil means 5 is thereby reliably prevented from colliding against the other, and thereby being damaged, upon moving into the defined alignment.

Alternatively or additionally, the second coil means 5 also has at least one stopper 17 (not represented).

Figure 3:
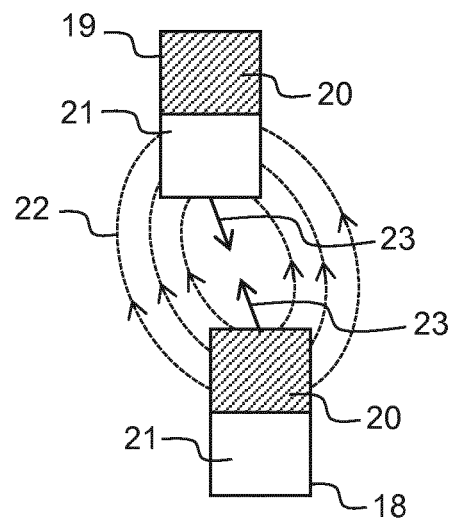
FIG. 3 illustrates a schematic representation of the operating principle of a magnetic force in the case of an inductive charging system for a vehicle.

FIG. 3 shows a schematic representation of the operating principle of the attractive magnetic force 23 between the first coil means 3 and the second coil means 5, or between the at least one first magnetic module 12 and the at least one second magnetic module 13. In FIG. 3, the first coil means 3 and the second coil means 5, or the at least one first magnetic module 12 and the at least one second magnetic module 13, are represented schematically by a first bar magnet 18 and a second bar magnet 19. Both the first bar magnet 18 and the second bar magnet 19 generate a respective magnetic field. The first bar magnet 18 and the second bar magnet 19 each have a north pole 20 and a south pole 21. The north pole 20 of the first bar magnet 18 and the south pole 21 of the second bar magnet 19 are opposite each other, in particular, close to each other. The field lines 22 emerging at the north pole of the first bar magnet 18 lead to the south pole 21 of the second bar magnet 19. Accordingly, the first bar magnet 18 and the second bar magnet 19 are each subject to an attractive magnetic force, represented by arrows 23, which moves the first bar magnet 18 and the second bar magnet 19 toward each other.

In a manner analogous to this schematic representation, the first constant magnetic field, generated by the first coil means 3, or the at least one first magnetic module 12, and the second constant magnetic field, generated by the second coil means 5, or the at least one second magnetic module 13, also cause an attractive magnetic force 23, which moves the first coil means 3 and/or the second coil means 5 autonomously, i.e., automatically, toward each other, in particular, into the defined alignment with respect to the second coil means 5, or relative to each other.

Figure 4:
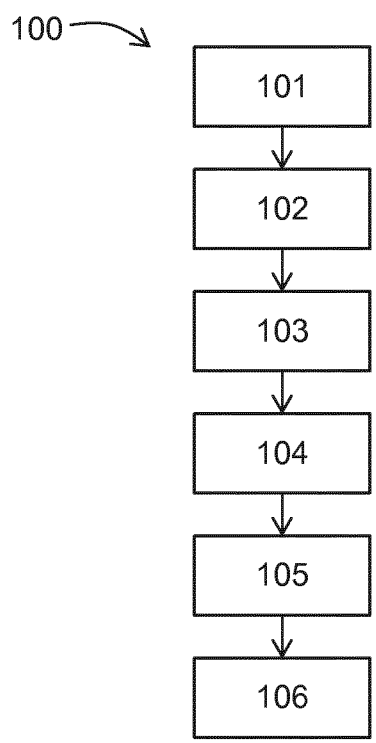
FIG. 4 illustrates a use of an inductive charging system for charging a vehicle.

FIG. 4 shows a method 100 of an embodiment of an inductive charging system 1 for charging a vehicle 2. In a first step 101, the first coil means 3 is positioned in the proximity of the second coil means 5, or the second coil means 5 is positioned in the proximity of the first coil means 3, in particular, by use of a radio-frequency positioning unit. In the second step 102, a first constant magnetic field is generated by the first coil means 3 or at least one first magnetic module 12. In step 103, a second constant magnetic field is generated by the second coil means 5 or at least one second magnetic module 13. In particular, the first constant magnetic field and the second constant magnetic field have the same spatial orientation, i.e., the spatially opposite poles are of opposite polarity.

In this way, the first and second constant magnetic fields generated in step 102 and 103 cause an attractive magnetic force 23 between the first coil means 3 and the second coil means 5. The magnetic attractive force causes the first coil means 3 to move toward the second coil means 5, and/or the second coil means 5 to move toward the first coil means 3. In particular, in this case the first coil means 3 and/or the second coil means 5 move/moves out of a respective original position. Preferably, this movement is made possible by a first positioning unit 6 and/or a second positioning unit 11. Furthermore, preferably, the movement is assisted by a first movement device of the first positioning unit 6 and/or by a second movement device of the second positioning unit 11.

As a result of the movement of the first coil means 3 toward the second coil means 5, and/or as a result of the movement of the second coil means 5 toward the first coil means 3, the first coil means 3 attains a defined alignment with respect to the second coil means 5, or the first coil means 3 and the second coil means 5 attain a defined alignment relative to each other. Following attainment of the defined alignment, the first positioning unit 6 and/or the second positioning unit 11 are/is fixed in position, in step 104. Then, in step 105, an alternating magnetic field, which induces a current in the second coil means 5, is generated in the first coil means 3. Preferably, an electrical storage unit of the vehicle 2, in particular an electric vehicle, is charged with the induced current.

Following completion of the charging operation, in step 106 the first coil means 3 is brought back into its first original position, and/or the second coil means 6 is brought back into its second original position.

LIST OF REFERENCES 1 inductive charging system
2 vehicle
3 first coil means
4 charging station
5 second coil means
6 first positioning unit
7 ground
8 rollers
9 hydraulic system
10 vehicle floor
11 second positioning device
12 first magnetic module
13 second magnetic module
14 positioning assistance means
15 first positioning element
16 second positioning element
17 stopper
18 first bar magnet
19 second bar magnet
20 north pole
21 south pole
22 magnetic field lines
23 attractive magnetic force
100 use of an inductive charging system for a vehicle
101 positioning of the first coil means in the proximity of the second coil means
102 generating a first constant magnetic field
103 generating a second constant magnetic field
104 fixing the first and/or second positioning unit in position
105 inductive charging of the energy storage unit of a vehicle
106 moving the first and/or second coil means into the respective original position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inductive charging system for a vehicle having an electrical storage unit, comprising:
   a first coil means for a charging station, the first coil means including a first positioning element with a convex conical shape;
   a second coil means for mounting on a vehicle, wherein the second coil means is designed to interact magnetically with the first coil means, the second coil means including a second positioning element with a concave conical shape; and
   a first positioning device that movably supports the first coil means, wherein the system is designed to generate, between the first coil means and the second coil means, an attractive magnetic force that effects a defined alignment of the first coil means with respect to the second coil means by the first positioning device;
   wherein the first positioning element is configured to fit into the second positioning element in the defined alignment; and
   wherein the first positioning device movably supports the first coil means in such a manner that a translational movement and a tilting movement of the first coil means in at least one spatial direction, out of a first original position, are possible.

2. The inductive charging system as claimed in claim 1, wherein the first coil means is designed to generate a first constant magnetic field, and the second coil means is designed to generate a second constant magnetic field, wherein the first constant magnetic field and the second constant magnetic field are oriented in relation to each other in such a manner that an attractive magnetic force is generated between the first coil means and the second coil means.

3. The inductive charging system as claimed in claim 1, wherein the first coil means has at least one first magnetic module that is designed to generate at least one first constant magnetic field, and the second coil means has at least one second magnetic module that is designed to generate at least one second constant magnetic field, wherein the at least one first constant magnetic field and the at least one second constant magnetic field are oriented in relation to each other in such a manner that an attractive magnetic force can be generated between the first coil means and the second coil means.

4. The inductive charging system as claimed in claim 3, wherein the at least one first magnetic module is designed as at least one first permanent magnet or at least one first electromagnet, and the at least one second magnetic module is designed as at least one second permanent magnet or at least one second electromagnet.

5. The inductive charging system as claimed in claim 1, wherein the first positioning device has at least one first movement device, which is designed to generate the translational movement and the tilting movement of the first coil means in the at least one spatial direction.

6. The inductive charging system as claimed in claim 1, further comprising a second positioning device that movably supports the second coil means in such a manner that at least one of a translational movement and a tilting movement of the second coil means in at least one spatial direction, out of a second original position, is possible.

7. The inductive charging system as claimed in claim 6, wherein the second positioning device has at least one second movement device, which is designed to generate the at least one of the translational movement and the tilting movement of the second coil means in at least one spatial direction.

8. The inductive charging system as claimed in claim 6, wherein at least one of the first positioning device and the second positioning device is designed to fix at least one of the first coil means and the second coil means in the defined alignment.

9. The inductive charging system as claimed in claim 1, wherein attached to at least one of the first coil means and the second coil means is a stopper, which is designed to stop movement of at least one of the first positioning device and the second positioning device upon attainment of the defined alignment.

10. The inductive charging system as claimed in claim 1, further comprising:
   a radio-frequency positioning device that is designed to generate a radio-frequency signal in the first coil means; and
   antennas, mounted in the vehicle, that generate, from radio-frequency signals received by the antennas, a positioning signal relating to a relative position of the second coil means with respect to the first coil means, based on which positioning signal the vehicle or its driver can align the second coil means with respect to the first coil means, according to the defined alignment, to an accuracy of at least 30 cm, by moving the vehicle.

11. The inductive charging system as claimed in claim 1, wherein at least one of the first coil means and the second coil means has a protection device arranged to protect the inductive charging system from external particles.

12. A method of an inductive charging system for charging a vehicle having an electrical energy storage unit, comprising:
   generating at least one first constant magnetic field by a first coil means that includes a first positioning element with a convex conical shape;
   generating at least one second constant magnetic field by a second coil means that includes a second positioning element with a concave conical shape, wherein the at least one second constant magnetic field is oriented relative to the at least one first constant magnetic field in such a manner that an attractive magnetic force is generated between the first coil means and the second coil means;
   aligning the first coil means and the second coil means into a defined alignment based on the attractive magnetic force and a movement of the first positioning element into the second positioning; and
   inductively charging the energy storage unit of the vehicle by use of the second coil means and the first coil means;
   wherein a movement of at least one of the first coil means and the second coil means by a translational movement and a tilting movement of at least one of the first coil means and the second coil means based on the attractive magnetic force as far as the defined alignment is assisted, by the translational movement and the tilting movement of at least one of the first coil means and the second coil means along at least one spatial direction, by a movement device.

13. The method as claimed in claim 12, wherein, following inductive charging of the energy storage unit of the vehicle, at least one of the first coil means and the second coil means is moved out of the defined alignment into an original position, by the movement device.

14. The inductive charging system as claimed in claim 2, further comprising a second positioning device that movably supports the second coil means in such a manner that at least one of a translational movement and a tilting movement of the second coil means in at least one spatial direction, out of a second original position, is possible.

15. The inductive charging system as claimed in claim 2, wherein at least one of the first coil means and the second coil means has a protection device arranged to protect the inductive charging system from external particles.

16. The method as claimed in claim 12, wherein, following inductive charging of the energy storage unit of the vehicle, at least one of the first coil means and the second coil means is moved out of the defined alignment into an original position, by the movement device.

17. The inductive charging system as claimed in claim 1, wherein the first positioning device includes rollers disposed on a lower surface of the first positioning device.

\* \* \* \* \*